US009838372B2

(12) United States Patent
Eld et al.

(10) Patent No.: US 9,838,372 B2
(45) Date of Patent: Dec. 5, 2017

(54) IDENTIFYING SERVICE PROVIDERS FOR INTEGRATING A SECURE ELEMENT INTO A SHORT-RANGE WIRELESS COMMUNICATION APPARATUS

(71) Applicant: FIDESMO AB, Spånga (SE)

(72) Inventors: Mattias Eld, Spånga (SE); Petter Arvidsson, Bromma (SE); Miguel Cardo Rodríguez, Madrid (ES)

(73) Assignee: FIDESMO AB, Spånga (SE)

( * ) Notice: Subject to any disclaimer, the term of this patent is extended or adjusted under 35 U.S.C. 154(b) by 110 days.

(21) Appl. No.: 15/025,235

(22) PCT Filed: Oct. 10, 2014

(86) PCT No.: PCT/SE2014/051203
§ 371 (c)(1),
(2) Date: Mar. 25, 2016

(87) PCT Pub. No.: WO2015/053703
PCT Pub. Date: Apr. 16, 2015

(65) Prior Publication Data
US 2016/0241534 A1    Aug. 18, 2016

(30) Foreign Application Priority Data

Oct. 11, 2013 (SE) ........................ 1351210

(51) Int. Cl.
*H04L 29/06* (2006.01)
*H04L 29/12* (2006.01)
(Continued)

(52) U.S. Cl.
CPC .............. *H04L 63/08* (2013.01); *G06F 21/34* (2013.01); *H04L 63/205* (2013.01); *H04L 67/34* (2013.01);
(Continued)

(58) Field of Classification Search
CPC ....... G06F 21/34; H04W 12/06; H04W 4/003; H04W 4/001; H04L 67/34; H04L 63/205; H04L 63/08
(Continued)

(56) References Cited

U.S. PATENT DOCUMENTS 9,301,136 B2 *  3/2016  Kim ...................... H04W 12/06
2009/0191811 A1  7/2009  Griffin et al.
(Continued)

FOREIGN PATENT DOCUMENTS

WO  WO-2008/017907 A1  2/2008
WO  WO-2010/077194 A1  7/2010

OTHER PUBLICATIONS

Policy-based security channels for protecting network communication in mobile cloud computing, Itiani et al, Security and Cryptography (SECRYPT), 2011 Proceedings of the International Conference, IEEE, 20011.*

(Continued)

*Primary Examiner* — Jahangir Kabir
(74) *Attorney, Agent, or Firm* — Moore and Van Allen PLLC; W. Kevin Ransom (57) ABSTRACT

A particular authentication-based service is implemented via a physical authentication device. A service description of the particular authentication-based service is read from the physical authentication device via a user terminal; and based thereon, a service request is generated, which specifies a capability description of the user terminal. A communication node receives the service request and checks this against a database containing information about which node in a set of nodes that stores downloadable software for implementing which authentication-based services on which types of user terminals. If a match is found between at least one node and the particular authentication-based service, a download (Continued)

identification message is sent to the user terminal, which specifies at least one address string uniquely identifying a respective location for the downloadable software stored in the matching node(s). The downloadable software is configured to implement the particular authentication-based service on the particular mobile communication apparatus.

7 Claims, 3 Drawing Sheets

(51) Int. Cl.
    *H04W 12/06*     (2009.01)
    *H04W 4/00*     (2009.01)
    *G06F 21/34*     (2013.01)
    *H04L 29/08*     (2006.01)

(52) U.S. Cl.
    CPC .......... *H04W 4/001* (2013.01); *H04W 4/003* (2013.01); *H04W 12/06* (2013.01)

(58) Field of Classification Search
    USPC .................................................. 726/27–30
    See application file for complete search history.

(56) References Cited

U.S. PATENT DOCUMENTS

| | | |
|---|---|---|
| 2011/0010704 A1 | 1/2011 | Jeon et al. |
| 2011/0276961 A1 | 11/2011 | Johansson et al. |
| 2013/0019323 A1 | 1/2013 | Arvidsson et al. |
| 2013/0124349 A1 | 5/2013 | Khan et al. |
| 2014/0018040 A1* | 1/2014 | Kim ..................... H04W 12/06 455/411 |

OTHER PUBLICATIONS

International Search Report for PCT/SE2014/051203 dated Jan. 20, 2015.

Gerald Madlmayr, Josef Langer; "Managing an NFC Ecosystem", 7$^{th}$ International Conference on Mobile Business; University of Applied Sciences of Upper Austria, 2008 IEEE Computer Society.

International Preliminary Report on Patentability for PCT/SE2014/051203 dated Apr. 12, 2016.

* cited by examiner

IDENTIFYING SERVICE PROVIDERS FOR INTEGRATING A SECURE ELEMENT INTO A SHORT-RANGE WIRELESS COMMUNICATION APPARATUS

CROSS-REFERENCE TO RELATED APPLICATIONS

This application is a national stage application (filed under 35 §U.S.C. 371) of PCT/SE2014/051203, filed Oct. 10, 2014 of the same title, which, in turn, claims priority to Swedish Application No. 1351210-8, filed Oct. 11, 2013 of the same title; the contents of each of which are hereby incorporated by reference.

FIELD OF THE INVENTION

The present invention relates generally to solutions for implementing services based on secure elements stored in mobile devices. More particularly the invention relates to a communication node for identifying a network-based service resource.

BACKGROUND OF THE INVENTION

Today, an increasing number of services are implemented by use of different types of physical authentication devices, e.g. smartcards or access control cards. Recently, various solutions have also been put forward, which render it possible to emulate such physical authentication devices in for example a mobile telephone. Thus, the mobile telephone can replace one or more of the physical authentication devices.

US 2011/0276961 discloses a method for installing a non-smart-card-related application on a Near Field Communication (NFC) enabled device, such as an NFC-enabled mobile phone. If the NFC-enabled device is unable to identify or find the target application associated with a Target Identifier (Target ID) in a received Generic Control record, a look-up table in which Target IDs are associated with target URIs from which installation files for the target applications of the Target IDs can be downloaded is used to retrieve the target URI of the Target ID in the received Generic Control record. One or several installation files for the target application is then downloaded from the retrieved target URI, whereupon the target application of the Target ID in the received Generic Control record is installed on the NFC-enabled device using the downloaded installation file(s).

US 2013/0019323 presents a method, performed in a secure element, which is arranged to enable user applications of the secure element to verify authenticity of incoming user application commands. The method involves: receiving a command from a secure element reader for a user application on the secure element, the command including an application identifier of the user application; determining whether there is a matching user application in the secure element; invoking the matching user application; and establishing, when there is an absence of any matching user applications, a communication channel with a remote application manager server and sending an absent user application message to the application manager server indicating that the user application has been requested on the secure element. A corresponding secure element, method for an application manager server and application manager server are also presented.

US 2013/0124349 describes a solution for utilizing and provisioning an aggregated soft card, wherein a request for an aggregated soft card from a mobile device is received, which aggregated soft card includes a primary component soft card and at least one secondary component soft card. Component soft card data associated with each of the primary component soft card and the at least one secondary component soft card are requested from a plurality of issuing system servers. Further, aggregated soft card data are generated by establishing a link among the component soft card data received from the plurality of issuing system servers and sending the aggregated soft card data to the mobile device.

Consequently, as stated initially, it is possible to emulate physical authentication devices in mobile devices, such as smart-phones. However, there is yet no straightforward solution to find the appropriate software for emulating a particular physical authentication device in a given mobile device. On the contrary, it is typically very complex to execute this task successfully.

SUMMARY OF THE INVENTION

The object of the present invention is therefore to solve the above problem, and thus offer a simple and reliable means for transferring the functionality of one or more physical authentication devices to a mobile communication apparatus.

According to one aspect of the invention, the object is achieved by the initially described communication node, wherein it is presumed that, alternatively, the particular authentication-based service is implemented via a physical authentication device.

Further, the service request is based on a service description of the particular authentication-based service, which service description has been read out from the physical authentication device via the user terminal.

This communication node is advantageous because it automatically finds and presents an access means to a piece of software that is compatible with the user's mobile communication device (e.g. a smartphone) for emulating a particular physical authentication device (e.g. a credit card) therein. Thus, the process of replacing the functionality of a credit card with a smartphone is made very convenient.

Preferably, the physical authentication device is a smartcard, a contactless ticketing card and/or an access control card. Further, it is advantageous if the service description contains a Secure Element ID, a Mifare ID, a location descriptor and and/or Universal Resource Locator, URL, since these all represent accepted data sources.

According to one preferred embodiment of this aspect of the invention the communication node also has a second interface, and is further configured to receive a download request message from a mobile communication apparatus, for example as an effect of that a user has activated a link to the downloadable software provided by the communication node. The download request message contains an address string uniquely identifying a location for the downloadable software stored in a selected one of the at least one matching node. The downloadable software is configured to implement the particular authentication-based service on the mobile communication apparatus. Moreover, the communication node is configured to forward the download request message to the selected matching node; in response thereto, receive downloaded software from the selected matching node via the second interface; and then, forward the downloaded software to the mobile communication apparatus.

Hence, also implementing the replacement service for the user's physical authentication device in his/her mobile communication apparatus is made exceptionally uncomplicated.

According to another preferred embodiment of this aspect of the invention, if no match is found between the particular authentication-based service and a piece of information in the database identifying downloadable software stored in the set of nodes, the communication node is configured to perform the following steps. Forward the service request to the nodes in the set of nodes. In response to any download identification message from at least one matching node in the set of nodes, forward the download identification message to the user terminal via the first interface. Here, the download identification message specifies at least one address string uniquely identifying a respective location for downloadable software stored in the at least one matching node. As mentioned above, the downloadable software is configured to implement the particular authentication-based service on the particular mobile communication apparatus, and the download identification message is generated in response to a match found between the particular authentication-based service and software in the at least one matching node. The procedure of this embodiment is advantageous because the proposed communication node may not be fully updated at all points in time regarding which nodes that contain which downloadable software, and by this procedure it possible to find such newly added software. Naturally, in connection with encountering any newly added software, the database of the communication node is preferably updated accordingly.

According to another aspect of the invention, the object is achieved by the mobile communication apparatus described initially, which also contains a reader module and a client module. The reader module is configured to receive a service description of a particular authentication-based service from a physical authentication device via a wireless interface of the mobile communication apparatus, e.g. a short-range wireless interface of NFC type. The client module is configured to generate a service request based on the service description read out via the reader module, and cause the service request to be sent to the above-proposed communication node. The advantages of this mobile communication apparatus, as well as the preferred embodiments thereof, are apparent from the discussion above with reference to the proposed system.

According to still another aspect of the invention, the object is achieved by the method described initially, wherein it is presumed that, alternatively, the particular authentication-based service is implemented via a physical authentication device. The method further involves: reading out a service description of the particular authentication-based service from the physical authentication device via the user terminal, and generating the service request based on the service description. The advantages of this method, as well as the preferred embodiments thereof, are likewise apparent from the discussion above with reference to the proposed system.

According to a further aspect of the invention the object is achieved by a computer program product, which is loadable into the memory of a computer, and includes software adapted to implement the method proposed above when said computer program product is run on a computer.

According to another aspect of the invention the object is achieved by a computer readable medium, having a program recorded thereon, where the program is to control a computer to perform the method proposed above when the program is loaded into the computer.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

DESCRIPTION OF PREFERRED
EMBODIMENTS OF THE INVENTION

Figure 1:
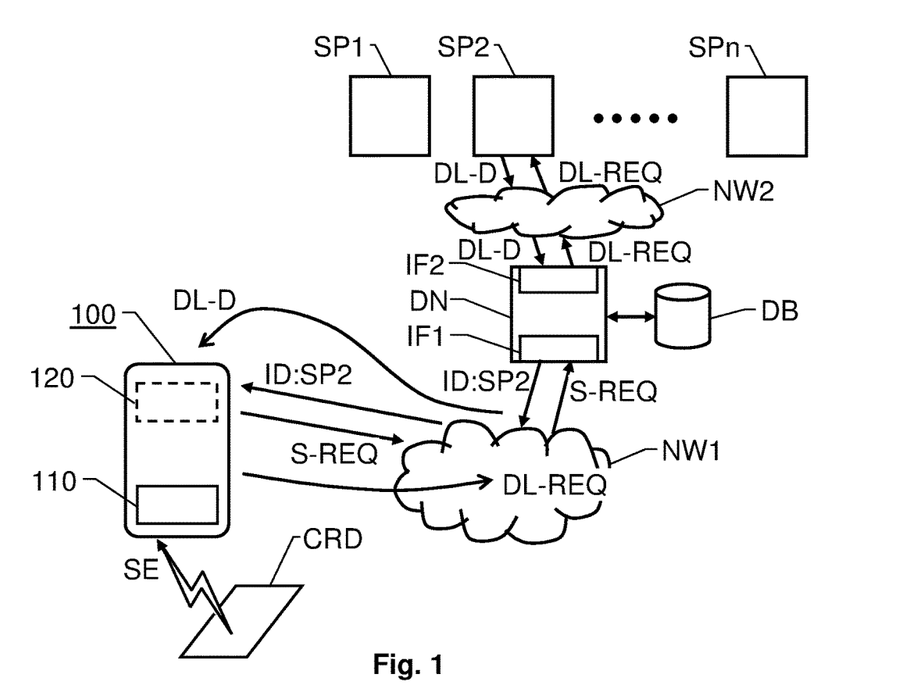
FIG. 1 shows a block diagram over a first example of a system in which the proposed communication node may be included.

Initially, we refer to FIG. 1 illustrating, by means of a block diagram, a first example of a system in which a proposed communication node DN may be included. The communication node DN is configured to identify a network-based service resource, if any, storing downloadable software for implementing a particular authentication-based service on a given mobile communication apparatus 100. Here, the network-based service resources are exemplified by a set of nodes SP1, SP2, . . . , SPn.

The communication node DN has a first interface IF1 via which it is configured to receive a service request S-REQ from a user terminal 100, such as a smartphone. The service request S-REQ specifies a particular authentication-based service and a capability description of a particular mobile communication apparatus 100, which is intended to emulate a particular authentication-based service.

Namely, it is presumed that, alternatively, the particular authentication-based service is implemented via a physical authentication device CRD. The physical authentication device CRD, in turn, can be represented by a smartcard, (e.g. implementing a credit card, a debit card, a driver's license, a passport, an identification card, a travel document or an automobile insurance card), a contactless ticketing card (e.g. implementing a charge card, a prepaid card, a check card, a loyalty card, an offer, a voucher, a coupon, a transit ticket, an entertainment ticket or a stored value ticket) or an access control card (e.g. combined with an identification card, a travel document, a loyalty card or a club membership card).

The service request S-REQ is based on a service description SE of the particular authentication-based service, which has been read out from the physical authentication device CRD via the user terminal 100. To this aim, the mobile communication apparatus 100 may contain a reader module 110 configured to receive a service description SE of a particular authentication-based service from a physical authentication device CRD via a short-range wireless interface of the mobile communication apparatus 100, e.g. an NFC interface. Further preferably, the service description SE contains one of a Secure Element ID, a Mifare ID, a location descriptor and a Universal Resource Locator (URL).

The mobile communication apparatus 100 also contains a client module 120 configured to generate the service request S-REQ based on the service description SE, and cause the service request S-REQ to be sent to a communication node DN via at least one interconnecting network NW1, for instance including a wireless access network. In response to the service request S-REQ, the communication node DN is configured to check the authentication-based service against a database DB containing information about which node in the set of nodes SP1, SP2, . . . , SPn that stores downloadable software for implementing which authentication-based services on which types of mobile communication apparatuses.

If the communication node DN finds a match between at least one matching node, say SP2, in the set of nodes SP1, SP2, . . . , SPn and the particular authentication-based service, the communication node DN is configured to send a download identification message ID:SP2 to the user terminal 100 via the first interface IF1 and the at least one network NW1. The download identification message ID:SP2 specifies at least one address string uniquely identifying a respective location for downloadable software stored in the at least one matching node SP2. The downloadable software is configured to implement the particular authentication-based service on the particular mobile communication apparatus 100.

According to one preferred embodiment of the invention, the communication node DN has a second interface IF2. Via the second interface IF2, the communication node DN is configured to receive a download request message DL-REQ from a mobile communication apparatus 100. The download request message DL-REQ, in turn, may have been produced based on the download identification message ID:SP2, and any address string included therein. The download request message DL-REQ contains an address string uniquely identifying a location for the downloadable software stored in a selected one of the at least one matching node SP2. I.e. by sending the download request message DL-REQ to the communication node DN, the user indicates which specific software that he/she wishes to install on the mobile communication apparatus 100 to replace/emulate the physical authentication device CRD. Thus, the downloadable software is configured to implement the particular authentication-based service on the mobile communication apparatus 100.

In response to the download request message DL-REQ, the communication node DN is configured to forward the download request message DL-REQ to the selected matching node SP2 associated with the address string uniquely identifying the location for the downloadable software. The selected matching node SP2, in turn, is expected to react to the download request message DL-REQ by sending corresponding software DL-D to the communication node DN.

When the communication node DN receives the downloaded software DL-D from the selected matching node SP2, the communication node DN is further configured to forward the downloaded software DL-D to the mobile communication apparatus 100 to enable installation of the software DL-D therein.

Figure 2:
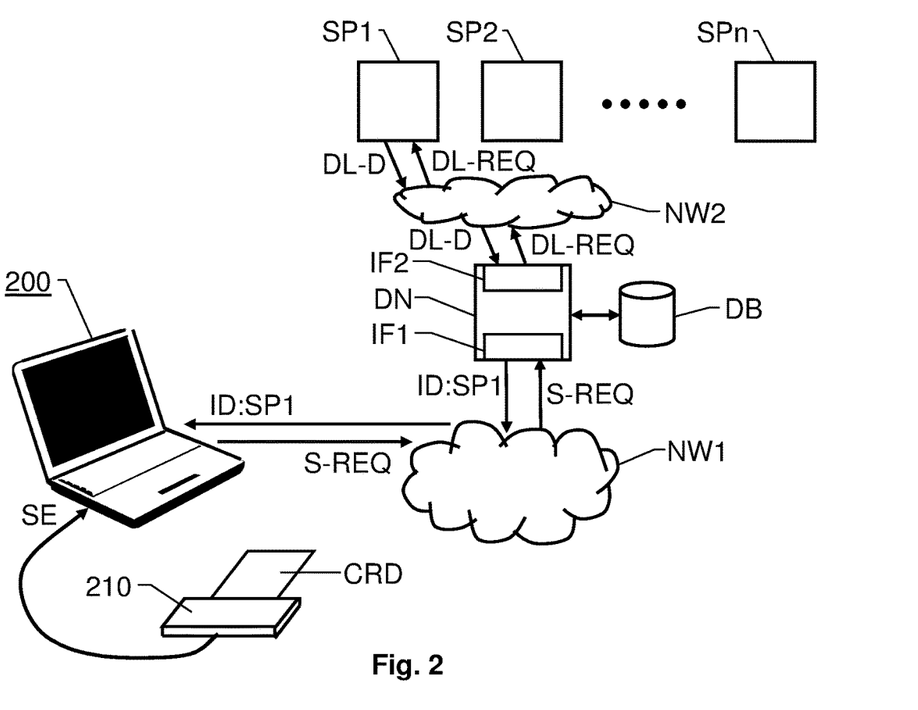
FIG. 2 shows a block diagram over a second example of a system in which the proposed communication node may be included.

FIG. 2 shows a block diagram over a second example of a system in which the proposed communication node DN may be included. In FIG. 2, all entities, units, devices and messages that also occur in FIG. 1 designates the same entities, units, devices and messages as described above with reference to FIG. 1.

In the embodiment of the invention shown in FIG. 2, a reader unit 210 is connected (e.g. via a cable) to a user terminal 200, such as a laptop or other computer apparatus. The reader unit 210 is configured to read out a service description SE of a particular authentication-based service from a physical authentication device CRD inserted into, or by any other means physically or logically connected to the reader unit 210. Analogous to the above, the user terminal 200 is configured to generate a service request S-REQ specifying the particular authentication-based service implemented by the physical authentication device CRD.

The service request S-REQ also contains a capability description of a particular mobile communication apparatus, which is intended to emulate the particular authentication-based service. Here, the particular mobile communication apparatus may either be the user terminal 200, or any other user terminal, such as smartphone synchronized, or by other means associated with this user terminal 200. In any case, the user terminal 200 provides said capability description to the communication node DN via the service request S-REQ. Hence, in this example, the communication node DN may find that a node SP1 in the set of nodes SP1, SP2, . . . , SPn provides a match with the particular authentication-based service and the user terminal 200 or 100. The communication node DN therefore sends a download identification message ID:SP1 to the user terminal 200 via the first interface IF1 and the at least one network NW1.

Figure 3:
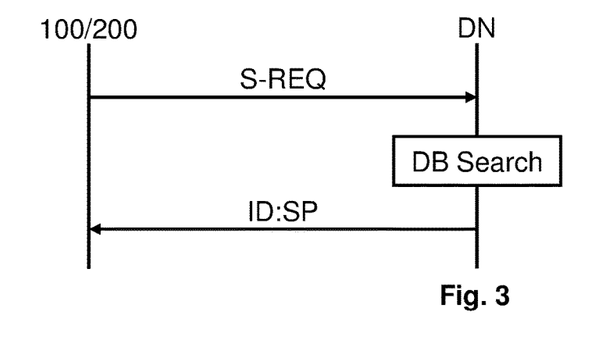
FIGS. 3-5 illustrate how messages and/or data may be sent between apparatuses and nodes according to embodiments of the invention.

FIG. 3 illustrates schematically how the service request S-REQ specifying: (i) a particular authentication-based service implemented by a physical authentication device CRD, and (ii) a capability description of a particular mobile communication apparatus is sent from a user terminal 100/200 to the proposed communication node DN. In response to receiving the service request S-REQ, the communication node DN executes a search in the database DB containing information about which node in a set of nodes that stores downloadable software for implementing which authentication-based services on which types of mobile communication apparatuses. If the communication node DN finds a match between at least one matching node in the set of nodes and the combination of the (i) particular authentication-based service and (ii) the capability description of the particular mobile communication apparatus, the communication node DN returns a corresponding download identification message ID:SP to the user terminal 100/200.

Figure 4:
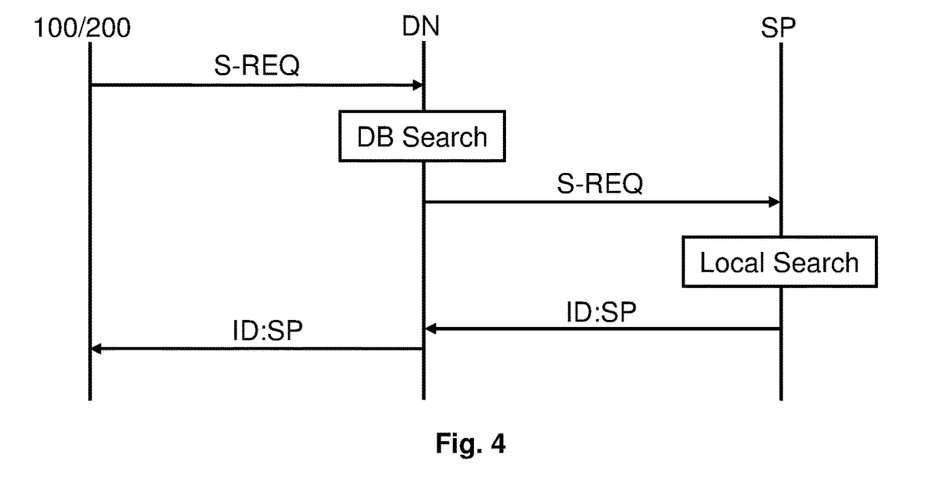

FIG. 4 illustrates schematically how the service request S-REQ is sent according to one embodiment of the invention if the communication node DN is unable to find a match in the database DB. In FIG. 4, all entities and messages that also occur in FIG. 3 designates the same entities and messages as described above with reference to FIG. 3. In FIG. 4, when the communication node DN concludes that there is no match in the database DB, the communication node DN forwards the service request S-REQ to at least one node SP, preferably all nodes, in a set of nodes which potentially store downloadable software for implementing authentication-based services mobile communication apparatuses. In response to the service request S-REQ, each node performs a local search for matching downloadable software. If a match is found, a corresponding download identification message ID:SP is returned to the communication node DN for forwarding to the user terminal 100/200.

Figure 5:
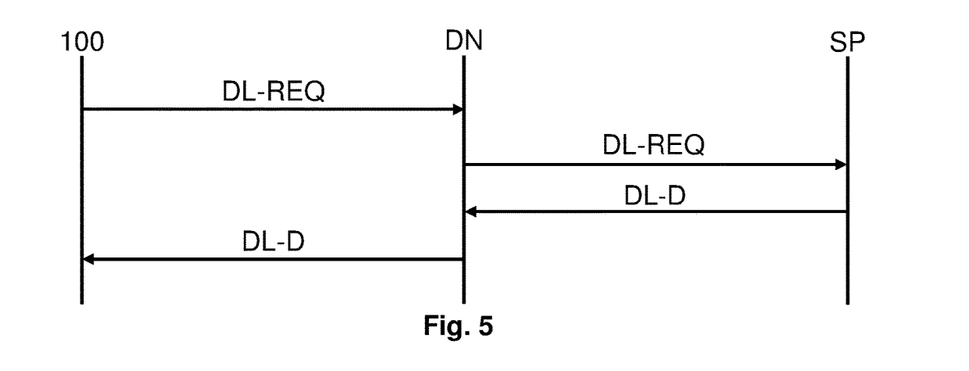

FIG. 5 illustrates a procedure according to one embodiment of the invention subsequent to the procedures shown in FIGS. 3 and 4, namely when a user initiates downloading of software from the network-based service resource associated with the download identification message ID:SP.

A download request message DL-REQ is originated by the user terminal 100, for instance by clicking on a link contained in the download identification message ID:SP, and sent via the at least one network NW1 to the communication node location DN. The download request message DL-REQ contains an address string uniquely identifying a location for the downloadable software stored in a selected matching node SP.

In response to the download identification message ID:SP, the communication node DN the forwards the download request message DL-REQ to the selected matching node SP. This node SP, in response to the download request message DL-REQ, sends software DL-D identified by the download request message DL-REQ to the communication node DN. The communication node DN finally forwards the software DL-D to the user termina) 100.

Figure 6:
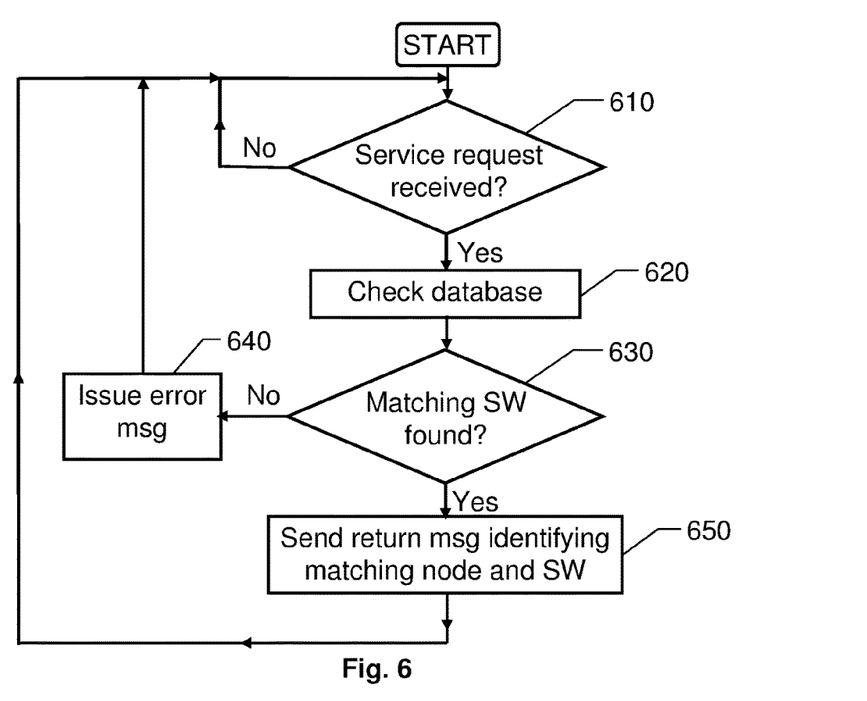
FIG. 6 illustrates, by means of a flow diagram, the general method according to the invention.

To sum up, and with reference to the flow diagram in FIG. 6, we will now describe the general method performed in the proposed communication node DN in order to find software for implementing a particular authentication-based service in a particular mobile communication apparatus according to the invention. Hence, FIG. 6 is basically analogous to what is illustrated in FIG. 3.

In a first step 610, it is checked whether or not a service request has been received. The service request S-REQ, in turn, is presumed to be based on a service description SE read out from a physical authentication device CRD via a user terminal. If a service request S-REQ from a user terminal is received, a step 620 follows. Otherwise, the procedure loops back and stays in step 610.

Step 620 checks the authentication-based service against a database DB containing information about which node in a set of nodes SP1, SP2, . . . , SPn that stores downloadable software for implementing which authentication-based services on which types of mobile communication apparatuses, and subsequent step 630 checks if a match is found in the database DB. If so, a step 650 follows. Otherwise, the procedure continues to a step 640, wherein an error message is generated. Then, the procedure loops back to step 610.

Step 650 returns a download identification message ID:SP to the user terminal, which download identification message ID:SP specifies at least one address string uniquely identifying a respective location for the downloadable software stored in the at least one matching node. Thereafter, the procedure loops back to step 610.

Figure 7:
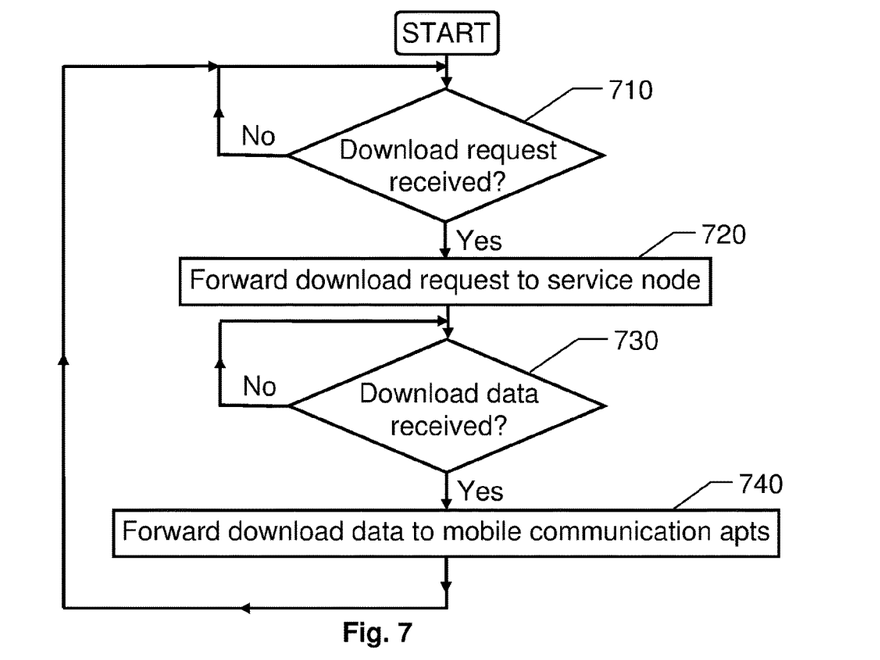
FIG. 7 contains a flow diagram illustrating one embodiment of the method according to the invention.

FIG. 7 shows a flow diagram illustrating one embodiment of the method according to the invention, namely how software is downloaded via the communication node DN to a user terminal, such as the mobile communication device 100 in which the software is to be installed, or an intermediary device, such as the above-mentioned laptop 200. Thus, FIG. 7 is essentially equivalent to FIG. 5.

A first step 710 checks if a download request message DL-REQ has been received from a user terminal 100/200. If so, a step 720 follows; otherwise, the procedure loops back and stays in step 710. Step 720 forwards the download request message DL-REQ to the selected matching node SP identified thereby. Then, a step 730 checks if, in response to the download request message DL-REQ, software DL-D has been received. If so, a step 740 follows; otherwise, the procedure loops back and stays in step 730.

Step 740 forwards the software DL-D to the user terminal 100/200 from which the download request message DL-REQ was received. Thereafter, the procedure loops back to step 710.

All of the process steps, as well as any sub-sequence of steps, described with reference to FIGS. 6 and 7 above may be controlled by means of a programmed computer apparatus. Moreover, although the embodiments of the invention described above with reference to the drawings comprise a computer apparatus and processes performed in a computer apparatus, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures, but may be varied freely within the scope of the claims.

The invention claimed is:

1. A communication node for identifying a network-based service resource, the communication node comprising a first interface, at least a hardware processor, and a non-transitory computer readable medium connected with the processor, comprising software instructions and when software instructions executed by the processor configure the processor to:
  receive a service request from a user terminal using the first interface, the service request specifying a particular authentication-based service and a capability description of a particular mobile communication apparatus;
  check the authentication-based service against a database containing information of which node in a set of nodes that stores downloadable software for implementing which authentication-based services on which types of mobile communication apparatuses;
  in response to the determination that a match is found between at least one matching node in the set of nodes and the particular authentication-based service, send a download identification message to the user terminal using the first interface, the download identification message specifying at least one address string uniquely identifying a respective location for downloadable software stored in the at least one matching node, which downloadable software is configured to implement the particular authentication-based service on the particular mobile communication apparatus;

read out a service description of a particular authentication-based service from a physical authentication device using the user terminal;
generate the service request based on the service description;
in response to the determination that no match is found between the particular authentication-based service and a piece of information in the database identifying downloadable software stored in the set of nodes, forward the service request to the nodes in the set of nodes; and
in response to the determination that any download identification message from at least one matching node in the set of nodes, which download identification message specifies at least one address string uniquely identifying a respective location for downloadable software stored in the at least one matching node, which downloadable software is configured to implement the particular authentication-based service on the particular mobile communication apparatus, and which download identification message is generated in response to a match found between the particular authentication-based service and software in the at least one matching node, forward the download identification message to the user terminal using the first interface.

2. The communication node according to claim 1, comprising a second interface, and the processor further configured to:
receive a download request message from a mobile communication apparatus, the download request message comprising an address string uniquely identifying a location for the downloadable software stored in a selected one of the at least one matching node, which downloadable software is configured to implement the particular authentication-based service on the mobile communication apparatus;
forward the download request message to the selected matching node, in response thereto;
receive downloaded software from the selected matching node; and
forward the downloaded software to the mobile communication apparatus.

3. The communication node according to claim 1, wherein the physical authentication device is one of a smartcard, a contactless ticketing card and an access control card; and
the service description contains one of a Secure Element ID, a location descriptor and a Universal Resource Locator.

4. A method of identifying a network-based service resource in a communication node, the method comprising:
receiving, using a first interface, a service request from a user terminal, the service request specifying a particular authentication-based service and a capability description of a particular mobile communication apparatus;
checking the authentication-based service against a database containing information of which node in a set of nodes that stores downloadable software for implementing which authentication-based services on which types of mobile communication apparatuses;
in response to the determination that a match is found between at least one matching node in the set of nodes and the particular authentication-based service, sending a download identification message to the user terminal using the first interface, the download identification message specifying at least one address string uniquely identifying a respective location for the downloadable software stored in the at least one matching node, which downloadable software is configured to implement the particular authentication-based service on the particular mobile communication apparatus;
reading out a service description of a particular authentication-based service from a physical authentication device using the user terminal; and
generating the service request based on the service description;
in response to the determination that no match is found in between the particular authentication-based service and a piece of information in the database identifying downloadable software stored in the set of nodes, forwarding the service request to the nodes in the set of nodes; and
in response to the determination that, any download identification message from at least one matching node in the set of nodes, which download identification message specifies at least one address string uniquely identifying a respective location for downloadable software stored in the at least one matching node, which downloadable software is configured to implement the particular authentication-based service on the particular mobile communication apparatus, and which download identification message is generated in response to a match found between the particular authentication-based service and software in the at least one matching node, forwarding the download identification message to the user terminal using the first interface.

5. The method according to claim 4, further comprising:
receiving a download request message from a mobile communication apparatus, the download request message comprising an address string uniquely identifying a location for the downloadable software stored in a selected one of the at least one matching node, which downloadable software is configured to implement the particular authentication-based service on the mobile communication apparatus;
forwarding the download request message to the selected matching node, in response thereto;
receiving downloaded software from the selected matching node; and
forward the downloaded software to the mobile communication apparatus.

6. The method according to claim 4, wherein:
the physical authentication device is one of a smartcard, a contact less ticketing card and an access control card; and
the service description is one of a Secure Element ID, a location descriptor and a Universal Resource Locator.

7. A computer program product stored on a non-transitory computer readable medium, comprising software instructions for operation by a computing processor, said instructions when executed by the computing processor, performing a set of steps, the steps comprising:
receiving, using a first interface, a service request from a user terminal, the service request specifying a particular authentication-based service and a capability description of a particular mobile communication apparatus;
checking the authentication-based service against a database containing information of which node in a set of nodes that stores downloadable software for implementing which authentication-based services on which types of mobile communication apparatuses;
in response to the determination that a match is found between at least one matching node in the set of nodes and the particular authentication-based service, sending a download identification message to the user terminal using the first interface, the download identification message specifying at least one address string uniquely identifying a respective location for the downloadable software stored in the at least one matching node, which downloadable software is configured to implement the particular authentication-based service on the particular mobile communication apparatus;

reading out a service description of a particular authentication-based service from a physical authentication device using the user terminal;

reading out a service description of a particular authentication-based service from a physical authentication device using the user terminal; and generating the service request based on the service description;

in response to the determination that no match is found in between the particular authentication-based service and a piece of information in the database identifying downloadable software stored in the set of nodes, forwarding the service request to the nodes in the set of nodes; and in response to the determination that, any download identification message from at least one matching node in the set of nodes, which download identification message specifies at least one address string uniquely identifying a respective location for downloadable software stored in the at least one matching node, which downloadable software is configured to implement the particular authentication-based service on the particular mobile communication apparatus, and which download identification message is generated in response to a match found between the particular authentication-based service and software in the at least one matching node, forwarding the download identification message to the user terminal using the first interface.

* * * * *